United States Patent
Wilson et al.

(10) Patent No.: US 6,687,052 B1
(45) Date of Patent: Feb. 3, 2004

(54) CONFOCAL MICROSCOPY APPARATUS AND METHOD

(75) Inventors: Tony Wilson, Oxfordshire (GB); Mark Andrew Aquilla Neil, Oxfordshire (GB); Rimvydas Juskaitis, Oxfordshire (GB)

(73) Assignee: Isis Innovation Limited, Summertown (GB)

(*) Notice: Subject to any disclaimer, the term of this patent is extended or adjusted under 35 U.S.C. 154(b) by 0 days.

(21) Appl. No.: 09/889,464

(22) PCT Filed: Jan. 17, 2000

(86) PCT No.: PCT/GB00/00142

§ 371 (c)(1),
(2), (4) Date: Sep. 13, 2001

(87) PCT Pub. No.: WO00/43819

PCT Pub. Date: Jul. 27, 2000

(30) Foreign Application Priority Data

Jan. 22, 1999 (GB) .............................. 9901365

(51) Int. Cl.$^7$ .............................................. G02B 21/06
(52) U.S. Cl. ....................... 359/385; 359/368; 359/389; 359/234
(58) Field of Search ................ 359/368, 388, 359/389, 232, 234, 235, 385

(56) References Cited

U.S. PATENT DOCUMENTS 5,587,832 A   12/1996   Krause ................. 359/385
6,399,935 B1 * 6/2002 Jovin et al. ................. 250/216

FOREIGN PATENT DOCUMENTS

WO   WO 97/31282   8/1997

OTHER PUBLICATIONS

Verveer et al., "Theory of confocal fluorescence imaging in the programmable array microscope (PAM)", *Journal of Microscopy*, vol. 189, Pt 3, Mar. 1988, pp. 192–198.
Hanley et al., "Optical Sectioning Fluorescence Spectroscopy in a Programmable Array Microscope", *Applied Spectroscopy*, vol. 52, No. 6, 1998, pp. 783–789.

* cited by examiner

Primary Examiner—Mark A. Robinson
Assistant Examiner—Lee Fineman
(74) Attorney, Agent, or Firm—Drinker Biddle & Reath LLP (57) ABSTRACT

The confocal microscope has two matched light sources: a first light source (1) and a second light source (8). The light sources (1,8) are arranged to illuminate opposite sides of a modulating mask (6). The light either reflecting from or passing through the modulating mask (6) is then used to illuminate an object O supported on a mount (5). The microscope is arranged so that the object O is mounted on the opposite side of the mask (6) to a camera (7) such that light reflected from the object O passes through the modulating mask (6) before being captured by the camera (7). Subtraction of the image produced using the second light source (8) from the image produced using the first light source (1) generates a confocal image that contains substantially less noise than is possible with available confocal microscopy apparatus.

14 Claims, 8 Drawing Sheets

CONFOCAL MICROSCOPY APPARATUS AND METHOD

The present invention relates to a confocal microscopy apparatus and method and in particular to confocal microscopy apparatus that enables real-time imaging to be performed.

Confocal microscope systems were originally designed to generate a substantially pure confocal image by scanning a diffraction limited spot of light across the object being imaged. Light reflected from separate scanned points of the object was sequentially received by a series of photodetectors to gradually build up a 2-D confocal image of the object. Such confocal systems have the disadvantage that a very bright light source such as a laser is necessary and real-time imaging could not easily be performed because of the time required to scan over the surface of the object.

More recent developments have focused on ways of increasing the speed with which confocal images can be generated to enable real-time imaging. In WO97/31282 a confocal microscope is described in which a mask is used to generate a combined confocal and non-confocal image. The non-confocal image is subsequently subtracted from the combined image to provide a substantially pure confocal image. The mask in WO97/31282 consists of different, separated regions with a first region being substantially transparent to incident light and unpatterned and a second region being patterned, for example with an irregular array of spots that are opaque to incident light. Light that passes through the first region illuminates the object to generate a conventional image of the object. On the other hand, light that passes through the second region produces a pattern of the mask on the surface of the object that in turn generates a combined confocal and conventional image of the object. The mask is spun so that the first and second regions of the mask alternately transmit the illumination to the object and so generate alternate images of the object. The alternate images are then subtracted from one another so that the conventional image is removed from the combined image to leave only the confocal image.

An alternative theoretical design of a confocal microscope is described in a paper that appeared in the Journal of Microscopy, Vol. 189, Pt 3, March 1998 entitled "Theory of confocal fluorescence imaging in the programmable array microscope (PAM)", Verveer et al. The programmable array microscope described in this paper consists of a spatial light modulator (SLM) in the form of a digital micromirror device (DMD). The individual pixels of the SLM are programmed to generate an arbitrary pattern of conjugate illumination and detection apertures and two separate cameras are used, one positioned to view active ('on') micromirrors of the SLM and to receive the confocal reflected light from the object and one to view inactive ('off') micromirrors and to receive a nonconjugate image of the object. However, significant difficulties have been encountered in developing the theoretical design to a working model and the design has never been made to work convincingly.

The present invention seeks to provide improved confocal microscopy apparatus that enables real-time imaging of an object and generates images containing less noise than is generally possible with current systems.

The present invention provides confocal microscopy apparatus comprising means for directing light to a specimen; at least one mask for encoding light incident on the specimen and for decoding light from the specimen to thereby generate a first image of the specimen consisting of a confocal image superimposed on a non-confocal image; and detection means for detecting said first image characterised in that there is further provided encoding means for encoding light to or from the specimen in reverse with respect to the encoding of the at least one mask to thereby generate a second image of the specimen consisting of a non-confocal image from which a confocal image has been removed.

Ideally, analysing means are provided for generating a confocal image of the specimen using the first and second images.

In a preferred embodiment a single mask is provided that encodes light incident on the specimen and decodes light from the specimen. The encoding means may consist of reflective patterning on one surface of the mask.

The microscopy apparatus may include one or more light sources. In particular, two light sources may be provided to illuminate each side of the mask respectively. Furthermore, the detection means may detect both the first and second images.

Alternatively, a second detection means may be provided for detecting the second image, the first and second detection means being located on opposite sides of the mask. The second detection means may be located to receive light reflected from said reflective patterning.

The mask may be patterned with equidistant light transmissive stripes and light barring stripes or with a random patterning. Also, the mask may be mounted for rotation about the optical axis of the apparatus.

In an alternative aspect the present invention provides a confocal microscopy method comprising providing illumination from a first light source; encoding light incident on a specimen and decoding light from the specimen by means of one or more masks; generating a first image of the specimen consisting of a confocal image superimposed on a non-confocal image; and detecting said first image characterised by encoding light to or from the specimen in reverse with respect to the encoding of the one or more mask and generating a second image of the specimen consisting of a non-confocal image from which a confocal image has been removed.

Ideally, the method further comprises generating a confocal image from said first and second images. Preferably, the second image is subtracted from the first image to extract the confocal image.

In a preferred embodiment a single mask is used to encode light to the specimen and to decode light from the specimen. Also, the second image may be generated by reflecting light off reflective patterning on one surface of said single mask. The mask may be rotatable.

Embodiments of the present invention will now be described by way of example with reference to the accompanying drawings, in which.

Figure 1:
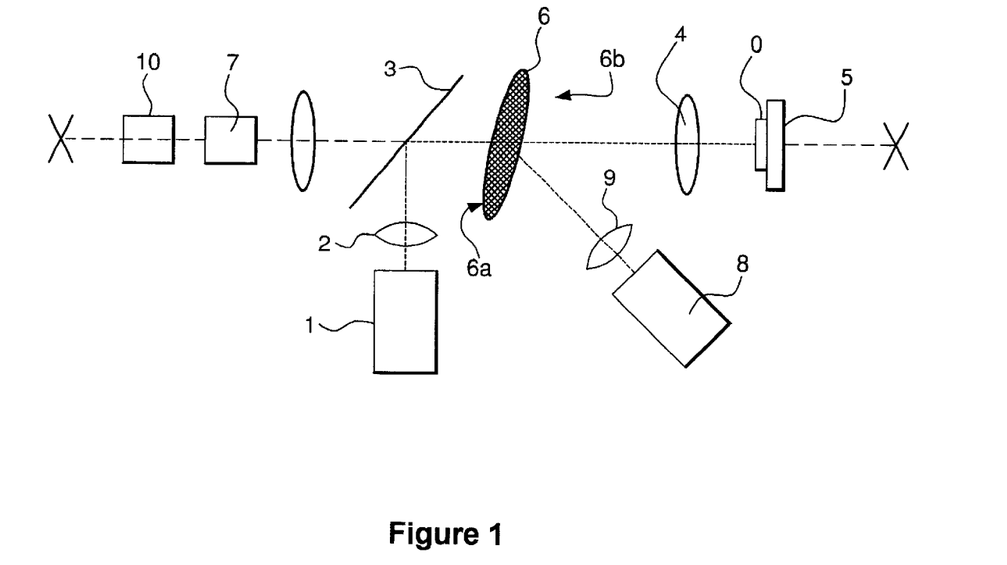
FIG. 1 is a schematic diagram of a first embodiment of confocal microscopy apparatus in accordance with the present invention.

Microscopy apparatus suitable for use in generating real-time confocal images is shown in FIG. 1. The microscopy apparatus includes a first light source 1 with an associated collimating lens 2 and a beam splitter 3 for directing light from the first light source 1 through an objective lens 4 to an object O or specimen supported on a mount 5. The beam splitter 3 may be a semi-silvered mirror, as shown in FIG. 1. Alternatively, a polarising beam splitter may be used in combination with a quarter waveplate located between the mask 6 and the object O so as to minimise the effect of spurious reflections. In the case of fluorescence microscopy, a dichroic beam splitter may conveniently be used.

Between the beam splitter 3 and the objective lens 4 a mask 6 is provided across the main optical axis X of the microscopy apparatus such that a first surface of the mask 6a is illuminated by the first light source 1. The mask 6 is encoded with a predetermined pattern that modulates spatially in the plane of the mask the light from the first light source 1. The modulation may be intensity, phase or polarisation modulation. In the following description reference will be made to intensity modulation, however, it will be understood that polarisation may be substituted for intensity or phase throughout. The mask 6 has transparent and opaque patterning that extends through the mask from its first surface 6a to its opposing second surface 6b. The patterning covers substantially all of the first and second surfaces of the mask. For example, as indicated in FIG. 1, the patterning may be in the form of regular stripes of substantially opaque material separated by stripes of substantially transparent material. Alternatively the patterning may be formed by an array of small spots or a wholly irregular pattern. In order to ensure substantially zero cross-correlation between individual points or pixels of the mask, the patterning may be determined using finite length binary time sequences such as time-shifted complementary Golay sequences with the number of sequences in the set limited to the sequence length. In the case of the mask shown in FIG. 1, the ratio of the transparent and opaque patterning is preferably 1:1 so as to maximise the light budget of the microscopy apparatus. Where the ratio is other than 1:1, the difference in the light transmitted/blocked by the patterning should be accommodated by normalisation factors employed in the extraction of the confocal image. The size of the patterning of the mask 6 is determined by the optical arrangement of the microscopy apparatus to the extent that the patterning must be resolvable on the object O.

The mask 6 is mounted with its normal at a small angle, for example a few degrees, to the main optical axis X of the apparatus. The angle is sufficiently small that it has only a nominal effect to the final imaging of the mask pattern on the object. Where the patterning of the mask is fixed, preferably the mask is mounted on an axle (not shown) for rotation about its normal. However, the mask 6 may be fixed so that no rotation is permitted depending upon the type of patterning employed for the mask 6 and in particular where the patterning can be cyclically altered such where a spatial light modulator (SLM) is used as the mask.

The beam splitter 3 is positioned to reflect light from the light source 1 towards the mask 6 and to allow light from the mask 6 to pass through to a camera 7. The camera 7 is preferably a CCD camera, however, alternative two dimensional image detectors may be employed such as a simple array of photodetectors.

A second light source 8 and an associated collimating lens 9 are also provided off the main optical axis of the apparatus so as to illuminate the second surface 6b of the mask that faces towards the object O. The second surface 6b of the mask bears reflective patterning that is substantially identical to the opaque patterning of the first surface of the mask. Preferably, where the opaque patterning of the mask extends through the thickness of the mask, the opaque patterning is made reflective at least on the second surface 6b of the mask. In this way it is ensured that the reflective patterning is identical to the opaque patterning which encodes light from the first light source 1. Hence, the second surface 6b of the mask 6 presents a reflective patterning to light from the second light source 8.

With the apparatus shown in FIG. 1, ideally the first and second light sources 1, 8 illuminate the mask 6 with substantially identical intensity. Where necessary, though, predetermined normalisation factors can be employed during extraction of the confocal image to accommodate any differences between the intensities of the two light sources. Although FIG. 1 shows two separate light sources alternatively, a single light source may be used that can be re-directed to illuminate either the first or second faces of the mask 6. This has the advantage of ensuring matched illumination of the mask.

The light sources are preferably in the form of light emitting diodes (LEDs). However, alternative light sources such as incandescent lamps, arc lamps or lasers may be employed. Arc lamps are particularly desirable where fluorescent imaging of biological samples is to be performed.

In use, the object O is alternately illuminated by the first and second light sources 1 and 8. In the case of light from the first light source 1, the light is reflected by the beam splitter 3 and is encoded by the mask 6 as it passes through the mask. The light thus forms an image of the opaque patterning of the mask on the object O at a predetermined plane. The encoded light is then reflected by the object O back through the mask 6 to the beam splitter 3. As the reflected light returns through the mask 6, the light is decoded by the patterning of the mask. The decoded light then passes through the beam splitter 3 to the camera 7.

The image, referred to as the first or positive image, received by the camera 7 is thus a combination of a conventional image $I_{conv}$ superimposed with a confocal image $I_{conf}$ with the confocal image being produced from the encoded light that is focused on the object at the focal plane and is accurately decoded by the mask 6. On the other hand, light from the second light source 8 is reflected by the reflective patterning of the mask 6 at the second surface 6b to the object O to produce a reverse image of the opaque patterning on the object O at the focal plane. Thus, the encoding of the light from the second light source 8 is the reverse of the encoding of the light from the first light source 1. The light encoded by the reflective patterning is reflected by the object O back to the second surface 6b of the mask 6 and thence to the camera 7. The image, referred to as the second or negative image, received by the camera 7 is thus a conventional image $I_{conv}$ minus the confocal image $I_{conf}$ as the confocal image has not been transmitted by the mask to the camera 7.

The positive and negative images produced using the first and second light sources are then transferred to an analyser 10 which subtracts the negative image from the positive image, i.e. $(I_{conv}+I_{conf})-(I_{conv}-I_{conf})$. The resultant image 2 $I_{conf}$ is a confocal image having twice the intensity of confocal images produced using previous confocal microscopy systems. This in turn significantly increases the signal to noise ratio in the confocal images produced using the microscopy apparatus and method described above. The conventional image $I_{conv}$ may also be extracted by the analyser 10 by the addition of the positive and negative images. The conventional image is particularly useful in navigating around the object being imaged. As mentioned above, the positive and negative images may be normalised where necessary to accommodate differences in the intensity of the illuminating beams.

It will, of course, be apparent that where real-time imaging is required and alternate positive and negative images of the object are generated, each positive image and each negative image can be used twice with its corresponding neighbours in time. Thus, the microscopy apparatus is particularly suited to the confocal imaging of dynamic systems.

Figure 5A:
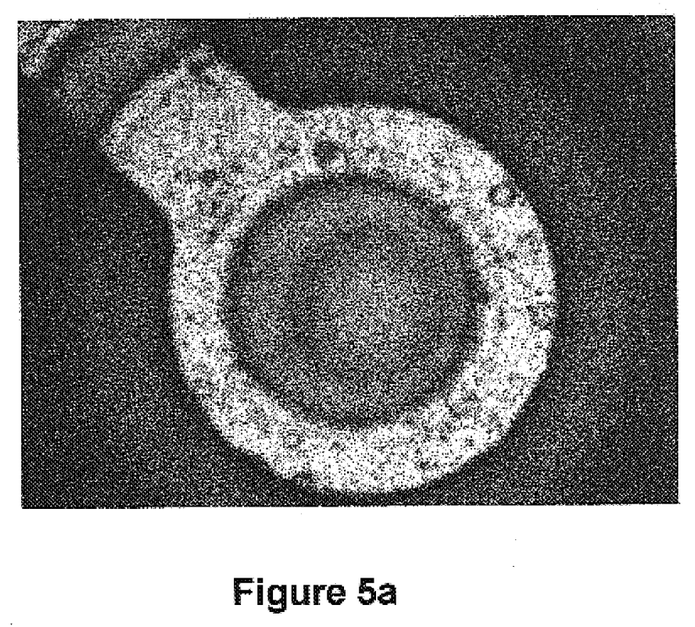
FIGS. 5a and 5b are combined confocal and conventional images of a transistor at a first focal plane produced using the apparatus of FIG. 1.
Figure 5B:
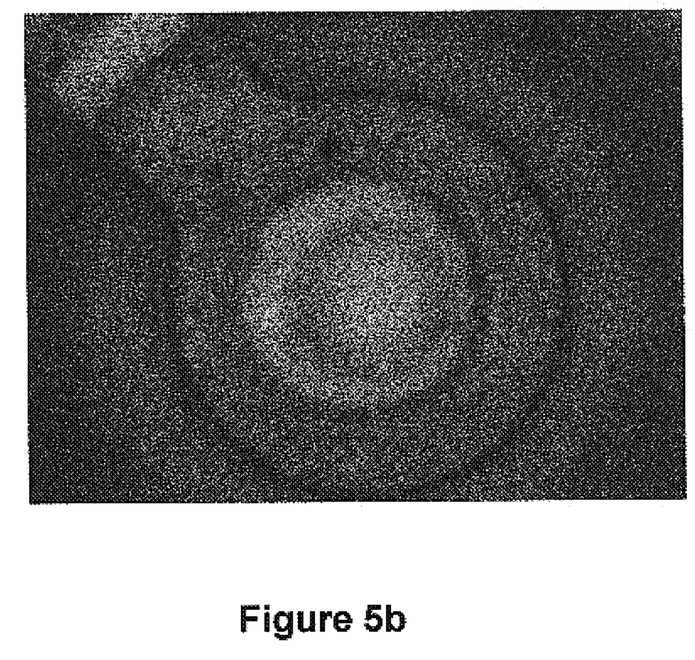
Figure 5C:
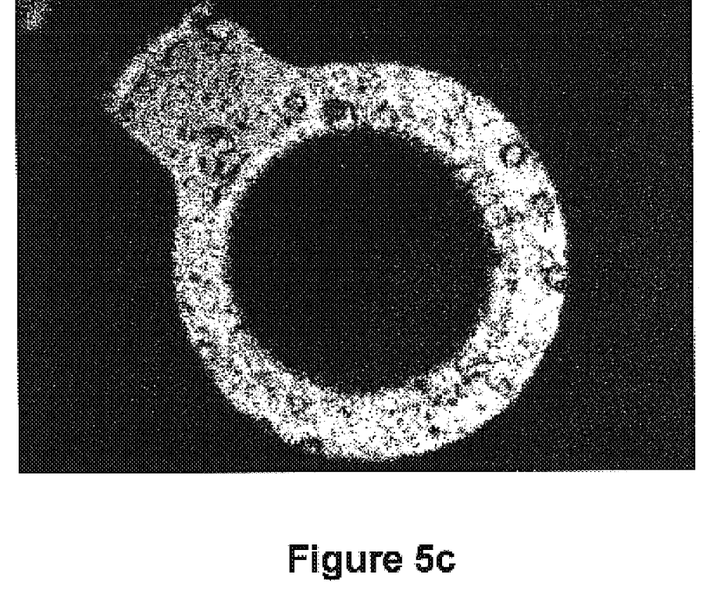
FIGS. 5c and 5d are respectively a confocal image and a convention image extracted from the images of FIGS. 5a and 5b.
Figure 5D:
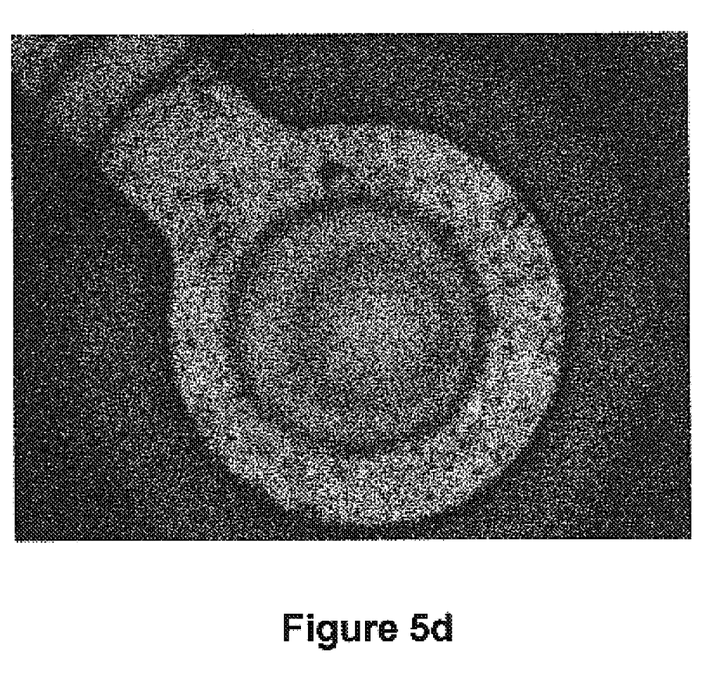
Figure 6A:
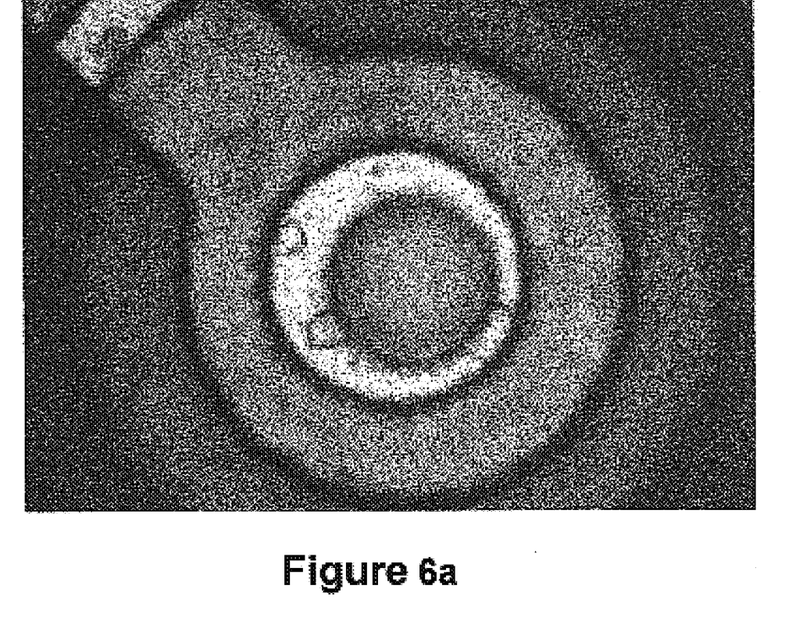
FIGS. 6a and 6b are combined confocal and conventional images of a transistor at a second focal plane produced using the apparatus of FIG. 1.
Figure 6B:
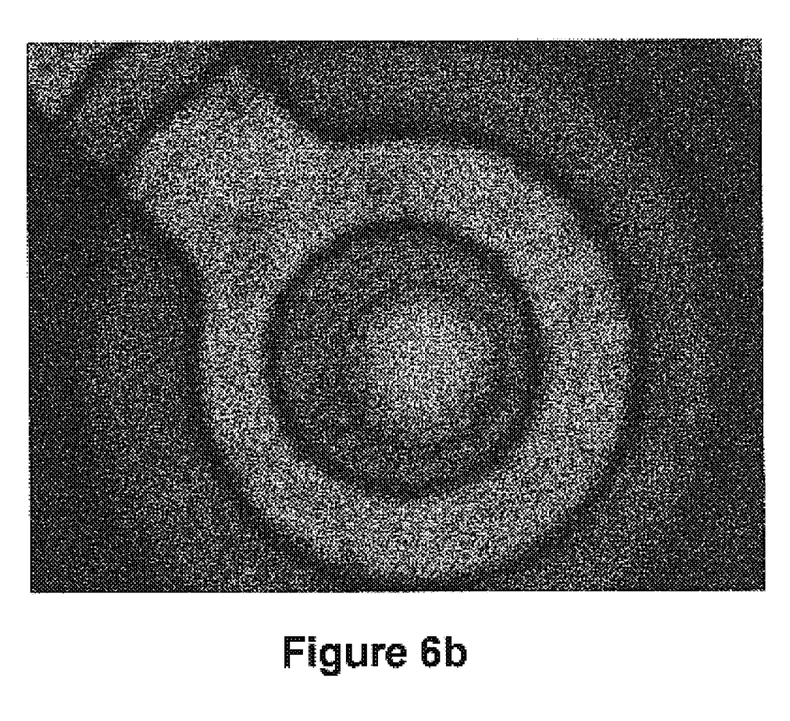
Figure 6C:
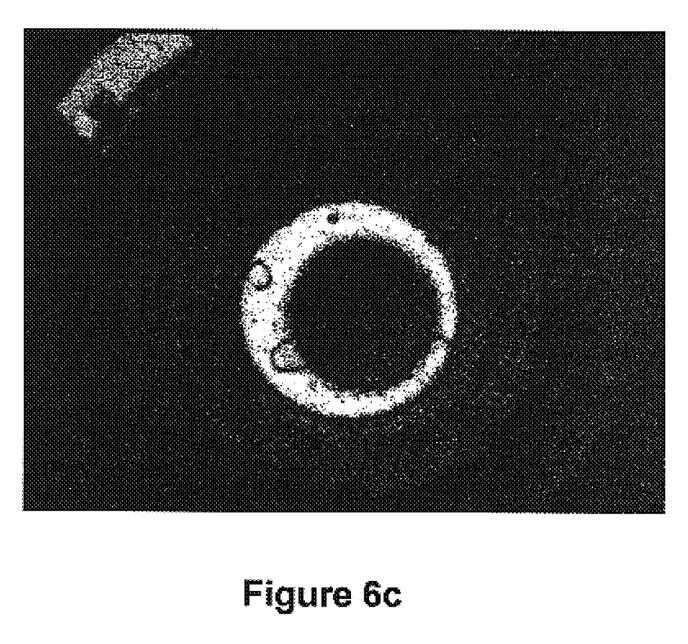
FIGS. 6c and 6d are respectively a confocal image and a convention image extracted from the images of FIGS. 6a and 6b.
Figure 6D:
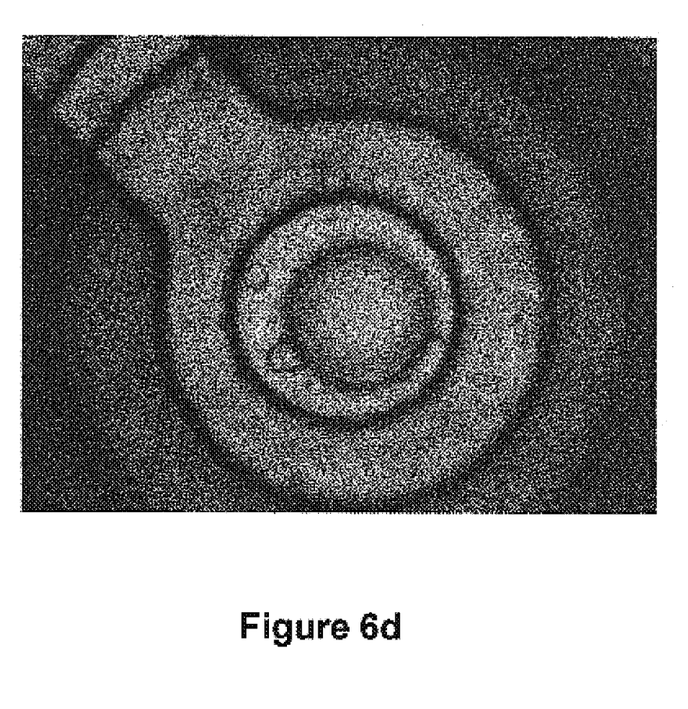

FIG. 5a is a positive image, $(I_{conv}+I_{conf})$ of a semiconductor transistor using the microscopy apparatus and method shown in FIG. 1 using a polarising beam splitter and LEDs as light sources. FIG. 5b is the negative image, $(I_{conv}-I_{conf})$, of the same transistor at the same focal plane. In FIG. 5c the confocal image extracted from the positive and negative images of FIGS. 5a and 5b is shown and FIG. 5d shows the extracted conventional image. It will be immediately apparent from FIG. 5c that the microscopy apparatus describe above is able to produce a particularly clear and strong confocal image. FIGS. 6a to 6d are further positive, negative, confocal and conventional images respectively of the same transistor at a second focal plane.

The images shown in FIGS. 5 and 6 were produced using a rotating disc having alternate transparent and opaque stripes, each stripe being approximately 80 μm wide. The mask was positioned with its normal at an angle of approximately 10° to the optical axis of the apparatus. In order to produce the confocal images at video rate, for example 25 Hz, each light source was operated at a frequency of 25/2 Hz. Of course the object could be illuminated at faster speeds, if necessary or at much slower speeds where real-time imaging is not required. Depending upon the type of light source used, the light source itself may be turned on and off at the desired speed or alternatively, the output of the light source may be shuttered to control the illumination of the object. Rotation of the disc at high speed enables the pattern of stripes on the disc to be removed from the final positive and negative images as the images can be integrated to average out the pattern of stripes.

Figure 2:
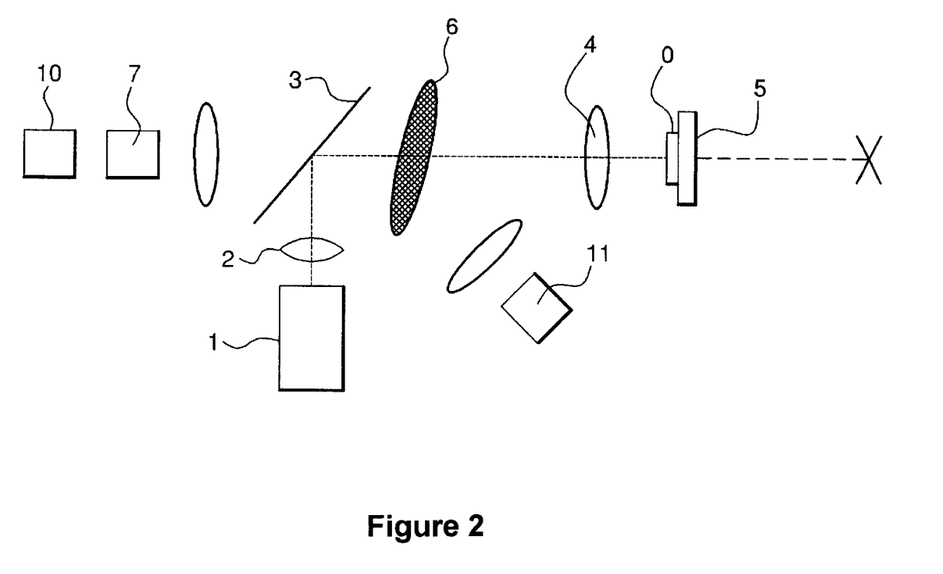
FIG. 2 is a schematic diagram of a second embodiment of confocal microscopy apparatus in accordance with the present invention.

In an alternative microscopy apparatus as shown in FIG. 2, a single light source 1 is used instead of two light sources. As in the previous embodiment the second surface 6b of the mask is reflective and the normal of the mask is set at a small angle, for example between 20° and 15°, to the main optical axis X of the apparatus. However, in this case the second light source is replaced by a second camera 11. As before a positive image is recorded by the first camera 7 however the negative image is simultaneously recorded by the second camera 11 from light reflected from the second surface of the mask 6. Both images are transmitted to the analyser 10 which then extracts the confocal image from the positive and negative images. This arrangement has the advantage that both images are produced simultaneously and so the confocal images can be produced approximately twice as fast. Also, the light budget is maximised as all available light is recorded either by the first or second cameras. However, this arrangement introduces greater difficulties with alignment as compared with the two light source system.

Figure 3:
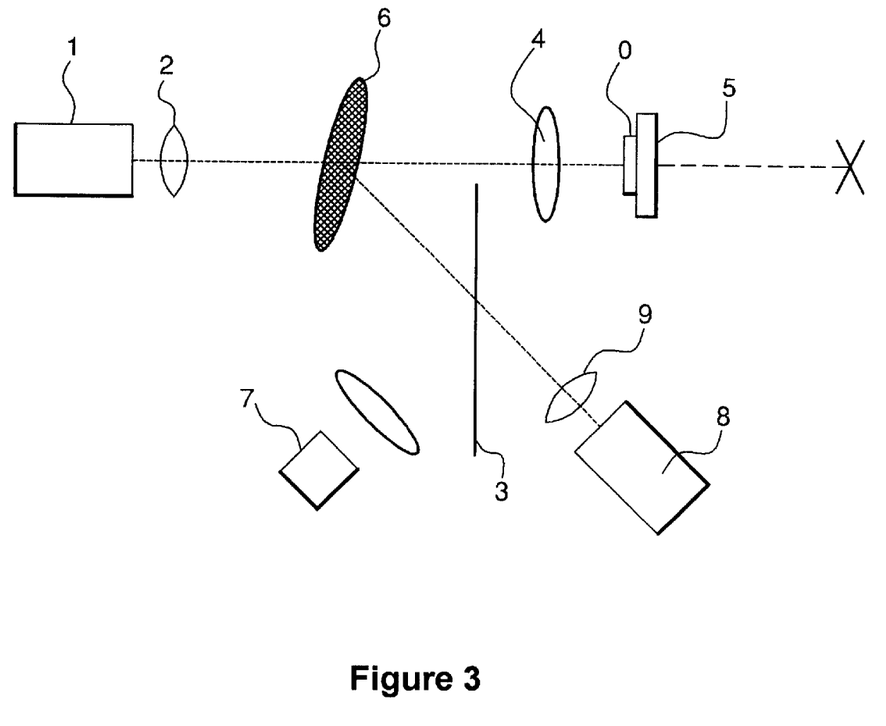
FIG. 3 is a schematic diagram of a third embodiment of confocal microscopy apparatus in accordance with the present invention.
Figure 4:
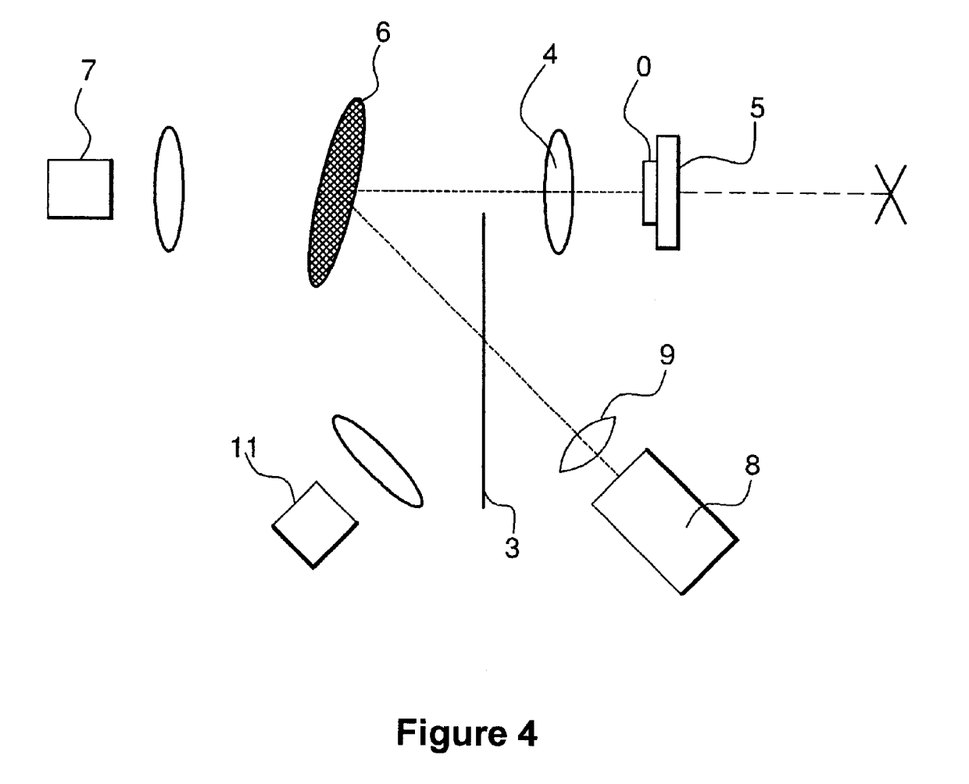
FIG. 4 is a schematic diagram of a fourth embodiment of confocal microscopy apparatus in accordance with the present invention.

In FIG. 3 a further alternative embodiment is shown in which two light sources are used. This embodiment is similar to the first embodiment except that the camera 7 is moved so that it only receives images reflected from the second surface 6b of the mask. With this arrangement the first light source 1 generates the negative image and it is the second light source 8, on the same side of the mask as the camera 7, that generates the positive images. A fourth embodiment is shown in FIG. 4 which is similar to FIG. 2 in that the apparatus includes two cameras 7 and 11. With this alternative arrangement the first camera 7 receives the negative image and the second camera 11, on the same side of the mask 6 as the light source 8 receives the positive image.

Although reference herein has been to the generation of a two-dimensional confocal image of an object, it will be appreciated that three-dimensional confocal images may be produced using the microscopy apparatus and method described above by creating a plurality of two-dimensional confocal images at different focal planes that are used to construct the three-dimensional image.

It will be apparent that the microscopy apparatus and method described above is suitable for most situations where confocal images are required. However, the apparatus and method is particularly suited for real-time imaging of biological processes and quality inspections for example of semiconductor chips. Although reference has been made throughout to light being reflected by the object, in many cases the object is not highly reflective in which case light scattered from the object is used to extract the confocal image. Also in the imaging of biological processes the incident light is not reflected by the object but rather is used to stimulate an equivalent pattern of fluorescence. The incident light is encoded in the manner described above and this pattern of light incident on the biological material stimulates fluorescence. The pattern of fluorescent light produced by the biological material is then decoded and positive and negative images are produced that can be subtracted to extract the confocal image in exactly the same way as described above.

Also, the confocal microscopy apparatus may be implemented in a conventional microscope through the addition of the encoded mask and either a second light source or a second camera.

It will of course be understood that alternative arrangements of optical elements, in particular alternative or additional lens arrangements, may be employed without departing from the spirit of the present invention. Furthermore, although reference has been made herein to a single mask having a patterned reflective surface it will be apparent that two or more transmission masks may be employed with one of the masks having a patterning that is the reverse of the patterning of one of the other masks.

What is claimed is:

1. Confocal microscopy apparatus comprising means for directing light to a specimen; a mask for encoding light incident on the specimen and for decoding light from the specimen, the mask having an opaque patterning on a first surface; and one or more image detectors for detecting images of the specimen characterised in that the mask has a reflective patterning on a second surface, the reflective patterning being substantially identical to the opaque patterning on the first surface of the mask whereby one of the first and second surfaces of the mask generates a first image of the specimen consisting of a confocal image superimposed on a non-confocal image and the other of the first and second surfaces of the mask generates a second image of the specimen consisting of a non-confocal image from which a confocal image has been removed.

2. Confocal microscopy apparatus as claimed in claim 1, wherein there is further provided analysing means for generating a confocal image of the specimen using the first and second images.

3. Confocal microscopy apparatus as claimed in claim 1, further including one or more light sources.

4. Confocal microscopy apparatus as claimed in claim 3, wherein two light sources are provided to illuminate each side of the mask respectively.

5. Confocal microscopy apparatus as claimed in claim 4, wherein a second image detector detected the first and second images.

6. Confocal microscopy apparatus as claimed in claim 4, further including a second image detector for detecting the second image, the first and second image detectors being located on opposite sides of the mask.

7. Confocal microscopy apparatus as claimed in claim 1, wherein the one or more image detectors are CCD cameras.

8. Confocal microscopy apparatus as claimed in claim 1, wherein the first surface of the mask is patterned with equidistant light transmissive stripes and light barring stripes.

9. Confocal microscopy apparatus as claimed in claim 1, wherein the first and second surfaces of the mask have a random patterning.

10. Confocal microscopy apparatus as claimed in claim 1, wherein the mask is mounted for rotation about the optical axis of the apparatus.

11. A confocal microscopy method comprising providing illumination from a first light source; encoding light incident on a specimen and decoding light from the specimen by means of a mask having an opaque patterning on a first surface; and detecting Images of the specimen characterised by the mask has a reflective patterning on a second surface that is substantially identical to the opaque patterning on the first surface of the mask and generating a first image of the specimen consisting of a confocal image superimposed on a non-confocal image by means of one of the first or second surfaces of the mask and generating a second image of the specimen consisting of a non-confocal image from which a confocal Image has been removed by means of the other of the first or second surfaces of the mask.

12. A confocal microscopy method as claimed in claim 11, further comprising extracting a confocal image from said first and second images.

13. A confocal microscopy method as claimed in claim 12, wherein the second Image is subtracted from the first Image to extract the confocal image.

14. A confocal microscopy method as claimed in claim 11, wherein the mask is rotated.

* * * * *